United States Patent [19]
Reiterman et al.

[11] Patent Number: 5,775,855
[45] Date of Patent: Jul. 7, 1998

[54] CUTTING INSERT AND CUTTER FOR MILLING

[75] Inventors: Lee Reiterman, Royal Oak; James D. Lark, II, West Bloomfield; Lawrence Plutschuck, Warren; Paul R. Doxen, Clinton Twsp., all of Mich.

[73] Assignee: Valenite Inc., Madison Hts., Mich.

[21] Appl. No.: 480,609

[22] Filed: Jun. 8, 1995

[51] Int. Cl.$^6$ ................................................ B23C 5/02
[52] U.S. Cl. .......................... 407/42; 407/113; 407/116
[58] Field of Search ........................... 407/42, 114–116, 407/113

[56] References Cited

U.S. PATENT DOCUMENTS

| | | | |
|---|---|---|---|
| 5,052,863 | 10/1991 | Satran | 407/116 |
| 5,207,538 | 5/1993 | Satran . | |
| 5,466,097 | 11/1995 | Wallstrom | 407/114 |
| 5,486,073 | 1/1996 | Satran et al. | 407/42 |

FOREIGN PATENT DOCUMENTS

| | | |
|---|---|---|
| 0392730 | 10/1990 | European Pat. Off. . |
| 0416901 | 3/1991 | European Pat. Off. . |
| 2626335 | 12/1976 | Germany . |
| 595921 | 2/1978 | Switzerland . |
| 1355037 | 5/1974 | United Kingdom . |
| 2103967 | 3/1983 | United Kingdom . |

OTHER PUBLICATIONS

ISCAR Brochure—ISCARMILL (Helimill/Helistar/Heliquad), pp.: Front, 6, 15.
ISCAR Brochure—Positive End Mills, pp. 11, 12, 13.
ISCAR Brochure—Inserts, pp. 219, 220.
Carboloy Brochure—Slot and End Milling Cutter 217.69, pp. 128, 129.
Sandvik Brochure—U—Max Endmills, RA/R215.44, pp. 178, 179, 180, 181.

*Primary Examiner*—Daniel W. Howell
*Attorney, Agent, or Firm*—Mary K. Cameron

[57] ABSTRACT

An insert for milling applications in which a radial rake face includes a concave conical portion defined to achieve constant positive radial rake throughout the length of a radial cutting edge at the angle of inclination thereof as the insert is intended to be mounted in a cutter body. The insert includes an axial rake face having a sloping portion defined to achieve positive axial rake as the insert is intended to be mounted in a cutter body. The upper surface of the insert includes planar regions and bend surfaces merging smoothly with the radial rake faces and axial rake faces to assist in chip expulsion during cutting.

20 Claims, 5 Drawing Sheets

Fig-10

CUTTING INSERT AND CUTTER FOR MILLING

BACKGROUND OF THE INVENTION

1. Field of the Invention

The present invention relates to an insert, particularly to a insert which is adapted for being detachably mounted on a tool holder for use in milling operations. Cutting inserts of the present invention are generally made of cemented metal carbide such as tungsten carbide and are formed by pressing techniques after which the pressed articles are sintered.

2. Description of Prior Art

Cutting inserts for milling are well known in the art. It is known to provide such inserts having polygonal shapes, straight cutting edges and surface features to enhance chip control.

Figure 7:
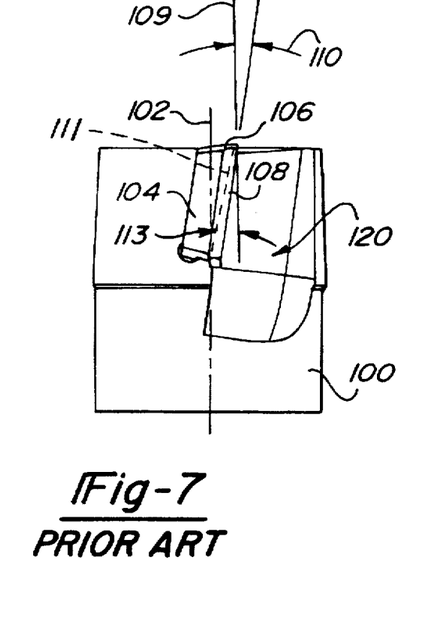
FIG. 7 is a side view of a milling tool of known type.
Figure 8:
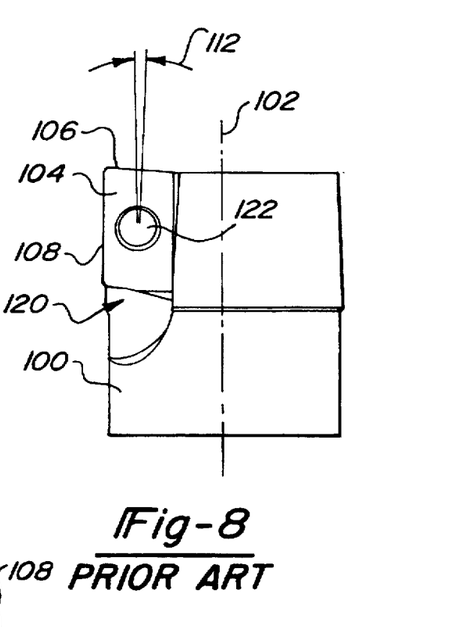
FIG. 8 is a second side view of the milling tool of FIG. 7.
Figure 9:
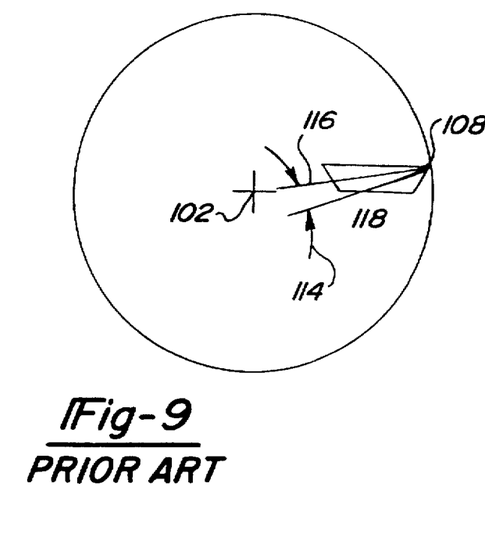
FIG. 9 illustrates the circle circumscribed by rotation of the tool of FIGS. 7 and 8.

FIGS. 7 and 8 illustrate a milling tool of known type with an insert 104 mounted therein. While only a single insert is illustrated in FIGS. 7 and 8, tools of this type may include plural flutes, such as flute 120, each providing a recess for mounting of an insert. In use, tool body 100 is rotated about axis 102, and surfaces of revolution generated by the cutting edge(s) of the insert(s) are cylindrical. FIG. 9 illustrates the circle circumscribed by a point on a radial cutting edge 108 of insert 104 by rotation of tool body 100. An axial cutting edge 106 cuts a face at the base of the cylinder cut by radial cutting edge 108.

So called positive inserts are intended for applications in which a cutting edge leads the insert rake face during chip formation. Such applications rely on relatively greater shear in formation of chips than applications in which the cutting edge lags the insert rake face in chip formation. To provide for cutting edge lead and allow clearance between the insert flank and the work during chip formation, an included angle between the insert rake face and insert flank surface is made acute. However, cutting edge strength tends to be directly proportional to the magnitude of the included angle, i.e., the greater the included angle, the greater the cutting edge strength. Insert design strikes a balance between these competing demands according to the intended application, tradeoffs being dictated by the nature of the material to be cut and the type of cutting. For example, for cutting materials such as aluminum which are relatively highly machinable, relatively narrow included angles can be used. Conversely, for materials such as steel which are relatively less machinable, edge strength must be greater and hence relatively wide included angles are preferred. Further, applications involving rough cutting involving relatively thicker chip formation, require relatively greater edge strength than do finishing operations involving relatively thinner chip formation.

In the tool of FIGS. 7 and 8 a so called positive insert is an insert providing both positive radial rake and positive axial rake, i.e. the cutting edges 108 and 106 are intended to lead the respective radial and axial rake faces of the insert during cutting. It is known to provide inserts for such applications in which features in the surface containing the rake faces are intended to increase radial and axial rake in accordance with intended orientation of the insert within a cutter body. However, with such known inserts, at increasing depths of cut design tradeoffs result in weakness of the cutting edge which are manifest in edge breakdown away from the lead corner. In addition, such known inserts are provided with increased material around the periphery of the mounting aperture which can result in jamming of chips, inhibiting their expulsion during cutting.

A further drawback of known inserts arises from orientation of the insert within the recess of the tool body. In FIG. 8 an angle 112 (shown greatly exaggerated) is measured between a longitudinal centerline of the insert and a line parallel to the axis of rotation of the tool. From FIG. 8 it will be understood that an insert having a straight cutting edge 106 will make point contact with the work when the angle 112 is other than zero. The point contact will result in grooving of the work as the tool is translated relative thereto. Known inserts include crowned axial cutting edges to effectively overcome such point contact.

It is an object of the present invention to provide an improved cutting insert for milling.

Yet another object of the present invention is to provide a milling insert which provides constant radial rake along its radial cutting edge.

Another object of the present invention is to provide a milling insert wherein chip expulsion is enhanced.

A further object of the present invention is to provide a milling insert wherein axial cutting forces are reduced during use.

Another object of the present invention is to provide a milling insert which reduces or eliminates grooving of a workpiece during cutting with the axial cutting edge.

Yet a further object of the present invention is to provide a milling insert having improved strength at the axial and radial cutting edges.

SUMMARY OF THE INVENTION

This invention achieves these and other objects by providing a polygonal milling insert, comprising an upper surface, a lower surface and a plurality of side surfaces which extend from the lower surface to the upper surface, the intersection of each side surface with the upper surface forming a cutting edge. As is customary, the cutting edges may be made sharp or radiused according to the intended cutting application. The insert includes a first or radial cutting edge and a second or axial cutting edge, the radial cutting edge and axial cutting edge extending substantially perpendicularly to one another from a common corner. In the upper surface of the insert and inward of the radial cutting edge is a concave conical surface extending along the radial cutting edge between corner portions of the upper surface, the conical surface narrowing in the direction of increasing depth of cut along the radial cutting edge. Inward of the axial cutting edge is a planar sloping portion of the upper surface extending between corner portions thereof, the sloping surface narrowing in the direction away from the common corner. Interiorly of the concave conical portion and the planar sloping portion, the upper surface includes a planar region which is merged smoothly with the concave conical portion and a blend surface which merges the planar region smoothly with the sloping portion and the common corner.

BRIEF DESCRIPTION OF THE DRAWINGS

This invention may be clearly understood by reference to the attached drawings in which like parts are designated by like reference numerals and in which.

DESCRIPTION OF THE PREFERRED EMBODIMENT

Figure 1:
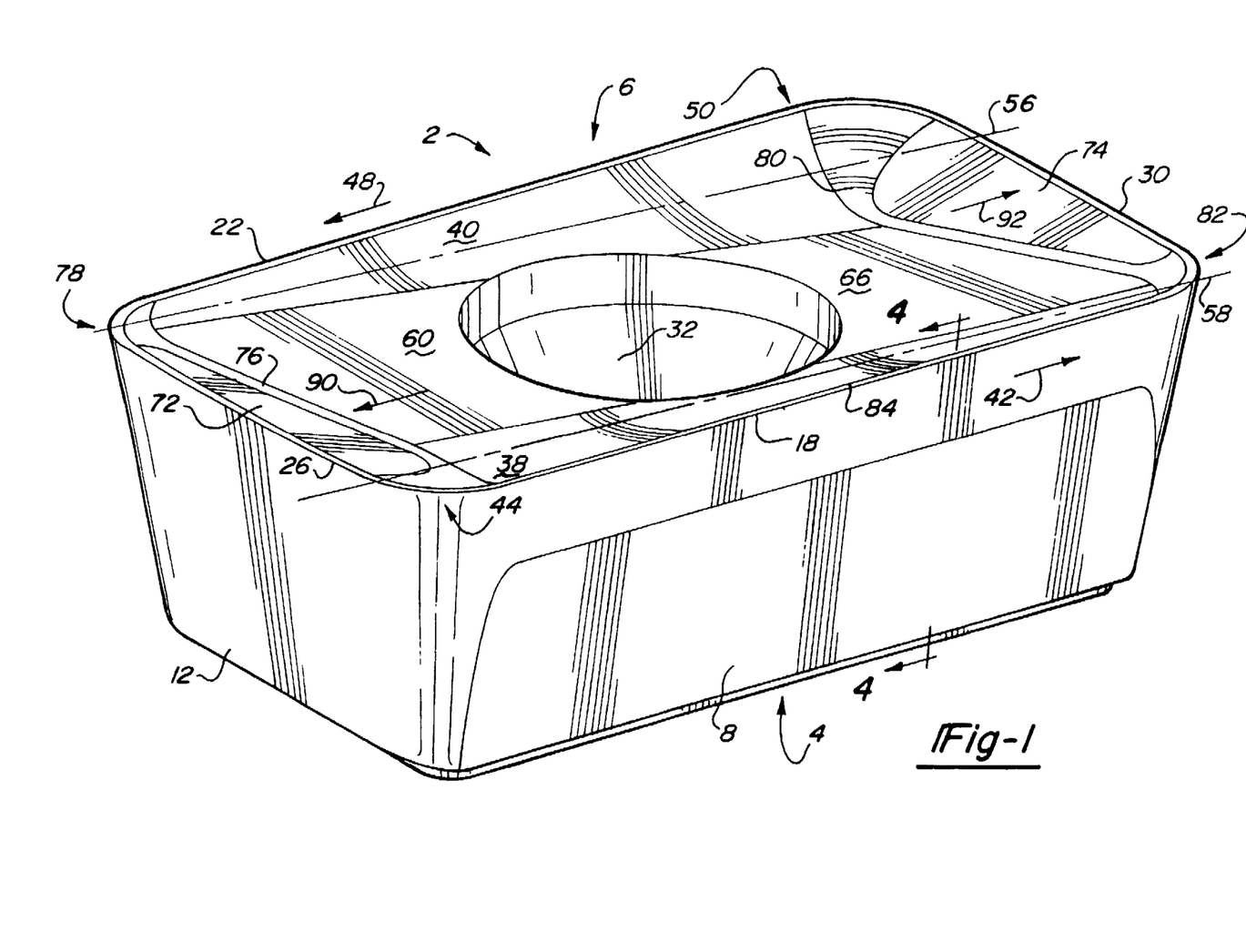
FIG. 1 is a perspective view of a milling insert of the present invention.
Figure 2:
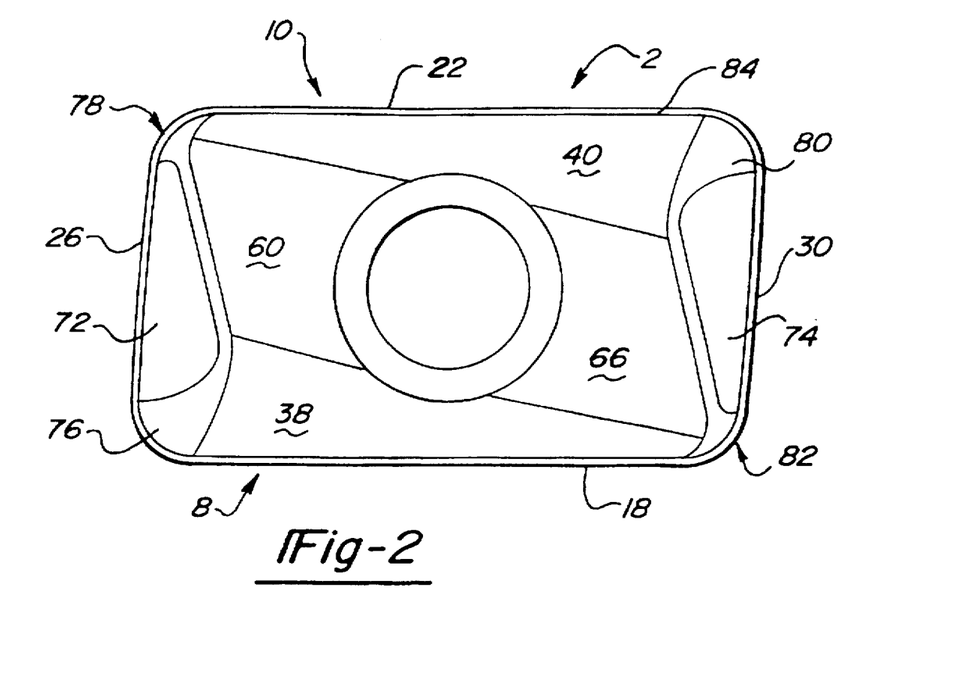
FIG. 2 is a plan view of the milling insert of FIG. 1.
Figure 3:
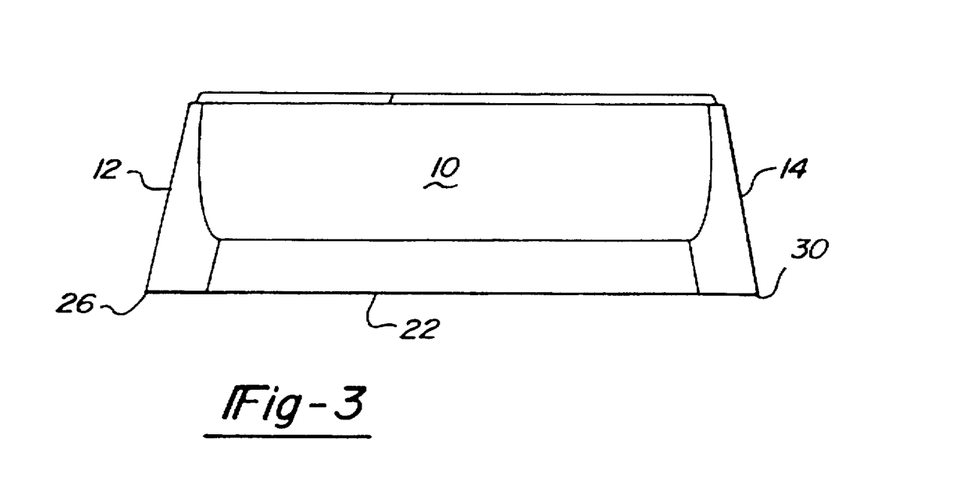
FIG. 3 is an elevational view of FIG. 2.

The embodiment which is depicted in the drawings is one which is particularly suited for achieving the objects of the invention. FIGS. 1 and 2 depict a milling insert 2 which comprises a lower surface 4 and an upper surface 6. In the embodiment of FIG. 1, lower surface 4 is planar. A plurality of side surfaces are provided which extend from lower surface 4 to upper surface 6, the intersection of each side surface with upper surface 6 forming a respective cutting edge. For example, in the preferred embodiment depicted in the drawings, a plurality of peripheral side surfaces 8, 10, 12, 14 are provided which extend upwardly and outwardly from lower surface 4 to upper surface 6. Side surface 8 extends upwardly and outwardly to a radial cutting edge 18 and side surface 10 extends upwardly and outwardly to radial cutting edge 22. Similarly, side surface 12 extends upwardly and outwardly to an axial cutting edge 26, and side surface 14 extends upwardly and outwardly to axial cutting edge 30. In the preferred embodiment of FIG. 1, the side surfaces 8 and 10 are each planar to provide planar flank areas which extend upwardly and outwardly from lower surface 4 to upper surface 6. In one alternative embodiment side surfaces 8 and 10 may each comprise more than one portion, including planar and curved portions to provide a compound flank surface at each such side surface.

A mounting aperture 32 extends through the milling insert 2 from lower surface 4 to upper surface 6. A mounting screw 122 such as shown in FIG. 8 typically extends through aperture 32 to mount the milling insert 2 in the usual manner. As intended to be mounted in a milling cutter, cutting edges 18, 22, 26, and 30 of insert 2 are active, in, at most, pairs, i.e., edges 18 and 26 will be engaged in cutting while cutting edges 22 and 30 are located interiorly of the cutter body periphery. Upon indexing of the insert, cutting edges 22 and 30 are made the active cutting edges.

In the illustration of FIG. 9 the angle 114 between a cutter body radius 116 passing through a point on the radial cutting edge 108 and a tangent 118 to the insert rake surface passing through the same point on cutting edge 108 is known as the radial rake angle, also referred to as radial rake. Positive radial rake is achieved when the radius 116 leads the tangent 118 in the direction of advance of cutting edge 108. As intended to be mounted in cutter body 100, radial cutting edge 108 is inclined at an angle 110 relative to a line parallel to tool axis 102. As a result of angle 110 of FIG. 7, the orientation of the insert in cutter body 100 changes the relationship of tool body radii, such as radius 116 of FIG. 9, to the rake face along the length of radial cutting edge 108. Applicants have determined that to produce constant radial rake throughout the length of cutting edge 108 it is advantageous to vary the direction of the tangent to the rake surface, such as tangent 118 of FIG. 9.

Figure 10:
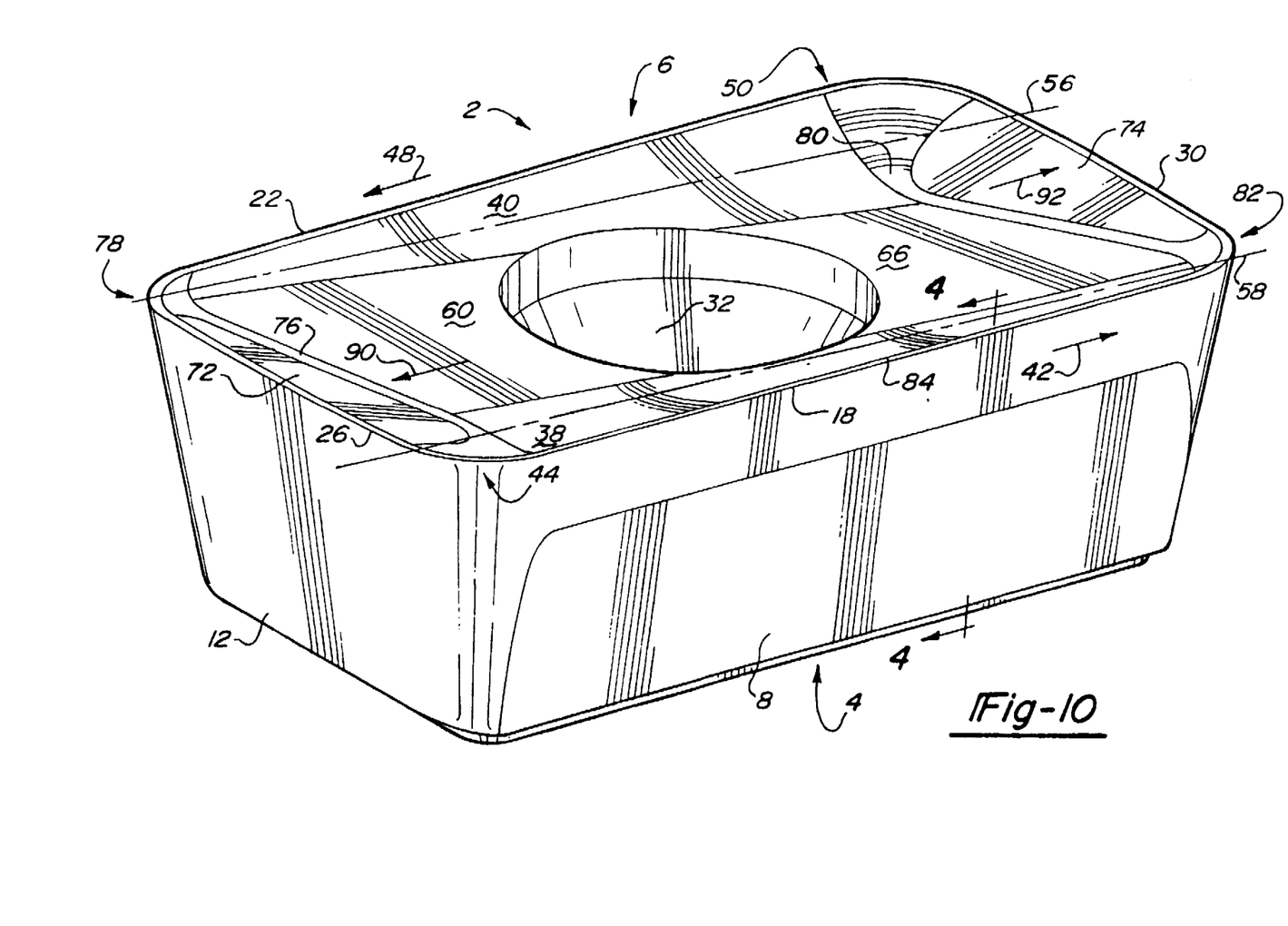
FIG. 10 is a perspective view showing concave conical portions having an elliptical cross section.

Referring to FIGS. 1 and 2, upper surface 6 of milling insert 2 includes a first conical portion 38 and a second conical portion 40 each of which is concave relative to the upper surface. Conical portion 38 has an associated cone axis 58 and narrows in the direction of arrow 42. Conical portion 40 has an associated cone axis 56 and narrows in the opposite direction as designated by arrow 48. In the embodiment of FIG. 1, conical portions 38 and 40 are each defined by cones having circular cross-section relative to respective cone axes 56 and 58. In one alternative embodiment shown in FIG. 10, conical portions 38 and 40 may be defined by cones have an elliptical cross-section relative to respective cone axes 56 and 58. In accordance with the definition of radial rake, and considering the effects on radial rake of angle 110 of FIG. 7, conical portions 38 and 40 are designed to produce substantially constant radial rake along the co-extensive length of the active radial cutting edge at a particular value of angle of inclination 110 of FIG. 7. By virtue of the concave conical surface, the effective volume of material of the insert body directly behind the radial cutting edge increases in the direction of increasing depth of cut of the milling cutter. Hence, increasing edge strength is realized at locations along the radial cutting edge associated with increasing depth of cut. Further, constant radial rake along the length of the radial cutting edge results in uniformity of cutting action, i.e., the shear angle along the length is constant and hence shear is constant along the cutting edge.

In FIG. 7, the angle 113 between a vertical 109 passing through a point on axial cutting edge 106 and a tangent 111 to the rake surface at the same point on the cutting edge 106 is the axial rake angle, also known as axial rake. Positive axial rake is achieved when the vertical 109 leads the tangent 111 in the direction of advance of cutting edge 106.

Upper surface 6 includes sloping portions 72 and 74 each of which extend or slope downwardly towards lower surface 4 as depicted in FIG. 1. Sloping portion 72 extends from second or axial cutting edge 26 towards first common corner 44, narrowing in the direction away from common corner 44. An opposite sloping portion 74 extends from fourth or axial cutting edge 30 towards second common corner 50, narrowing away from common corner 50. Surfaces 72 and 74 serve to reduce axial cutting forces by increasing the effective axial rake at the active one of cutting edges 26 and 30 as the insert is mounted in a milling cutter such as that shown in FIGS. 7 and 8. Narrowing of sloping portions 72 and 74 in the direction away from the respective common corners 44 and 50 increases the volume of the insert body adjacent the narrow ends of conical portions 38 and 40 serving to provide additional support to strengthen cutting edges 18 and 22 at the ends associated with greatest depth of cut.

Upper surface 6 of milling insert 2 also includes a first planar region 60 which extends between and merges with first conical portion 38, second concave conical portion 40 and sloping portion 72. In a like manner, a second planar region 66 at the opposite end of the milling insert 2 extends between and merges with second concave conical portion 40, first concave conical portion 38 and sloping portion 74. By allowing segments 60 and 66 to merge or come together with adjacent concave conical portions, without any abrupt change in surface contour, segments 60 and 66 serve to enhance chip expulsion during the milling operation.

Upper surface 6 includes a first blend surface 76 which merges the sloping portion 72 with concave conical portion 38 at common corner 44 and also merges concave conical portion 40 with corner 78 of upper surface 6 as depicted in FIGS. 1 and 2. A second blend surface 80 is provided which merges sloping portion 74 with concave conical portion 40 at common corner 50 and also merges the concave conical portion 38 with corner 82 of upper surface 6. Blend surfaces 76 and 80 smoothly and gradually merge all surfaces adjacent to such blend surfaces to facilitate chip expulsion.

Figure 4:
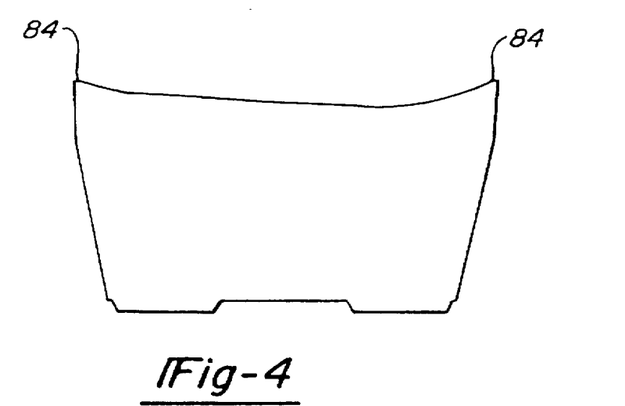
FIG. 4 is a cross-sectional view of FIG. 1 taken along lines 4—4.
Figure 5:
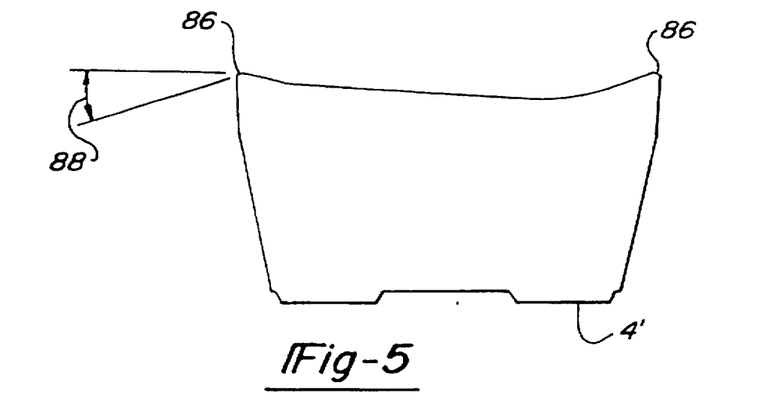
FIG. 5 is a cross-sectional view similar to FIG. 4 but of an alternative embodiment of the milling insert of the present invention.

In one embodiment, relatively narrow land areas are provided adjacent to at least two cutting edges. For example, in the embodiment depicted in FIGS. 1 to 4 all of the upper cutting edges 18, 22, 26, 30 comprise a land area 84. Although not necessary, such land area may be parallel to lower surface 4 as depicted in FIG. 4. In an alternative embodiment, as depicted in FIG. 5 a land area 86 may be provided which slopes downwardly relative to lower surface 4 and in this configuration is referred to as a negative-T land area. An angle of inclination 88 of negative-T land area 86 is conveniently defined relative to a plane transverse to the axis of mounting aperture 32 and has a value in the range of 5° to 20°. By providing a land area around the periphery of the milling insert, the upper cutting edge will be strengthened.

Figure 6:
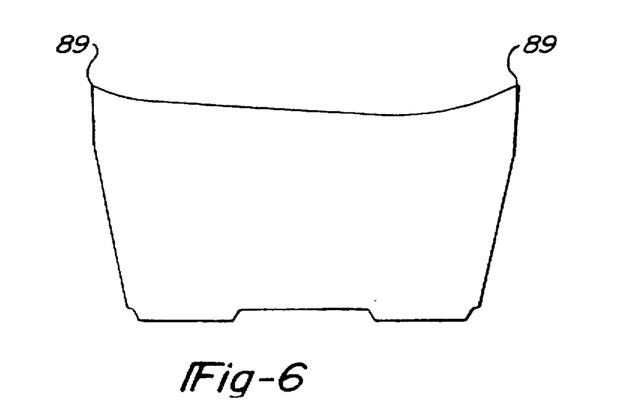
FIG. 6 is a cross-sectional view similar to FIG. 4 but of another alternative embodiment of the milling insert of the present invention.

In another embodiment, the narrow land area may be eliminated and the cutting edge may be in the configuration of a sharp edge 89 as depicted in FIG. 6.

In order to provide a smooth finish upon the workpiece, axial cutting edges 26, 30 are advantageously slightly curved outwardly relative to the center of upper surface 6 in the direction of respective arrows 90, 92. The curve of axial cutting edges 26, 30 is effective, within a range of values of angle 112 of FIG. 8, to wipe or sweep an area of workpiece material during cutting to eliminate point contact grooving and hence enhance the finish of the workpiece.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A milling insert comprising:

a polygonal body having an upper surface comprising a center and a periphery, a lower surface and a plurality of side surfaces extending between said upper surface and said lower surface, the side surfaces sloping outwardly from the lower surface to intersection with the upper surface;

a first radial cutting edge formed at the intersection of a side surface with the upper surface, the first radial cutting edge extending between corners of said upper surface, wherein the upper surface comprises a first concave conical portion adjacent said first radial cutting edge, the first concave conical portion extending between corner portions of the insert and narrowing in a direction associated with increasing depth of cut along the first radial cutting edge, and being formed to achieve constant positive radial rake, as defined with respect to a cutter body, throughout the length of the first radial cutting edge at the angle of inclination of said radial cutting edge as the insert is to be mounted in a cutter body with the first radial cutting edge positioned as an active radial cutting edge.

2. The milling insert of claim 1 wherein a narrow land is interposed between the radial cutting edge and the concave conical portion.

3. The milling insert of claim 2 wherein the upper and lower surfaces are quadrilateral.

4. The milling insert of claim 3 further comprising a first axial cutting edge extending substantially perpendicularly from a corner common with the first radial cutting edge.

5. The milling insert of claim 4 wherein the upper surface further comprises a first sloping portion adjacent said first axial cutting edge, said first sloping portion sloping downwardly from said first axial cutting edge, extending between corner portions of the insert, and narrowing in the direction away from the first common corner, the sloping portion defining a positive axial rake as the insert is intended to be mounted in a cutter body with the first axial cutting edge positioned as an active axial cutting edge.

6. The insert of claim 5 further comprising a mounting aperture extending through said milling insert from said lower surface to said upper surface.

7. The insert of claim 6 further comprising a first planar region adjacent the first concave conical surface and interiorly of the first sloping portion and extending to the mounting aperture, the first planar region sloping downwardly from a narrow end of the concave conical portion in the direction transverse thereto and sloping downwardly along the concave conical portion in the opposite direction of its narrowing.

8. A milling insert comprising:

a polygonal body having an upper quadrilateral surface, a lower quadrilateral surface and a plurality of side surfaces extending between said upper surface and said lower surface, the side surfaces sloping outwardly from the lower surface to intersection with the upper surface;

a first radial cutting edge formed at the intersection of a side surface with the upper surface, the first radial cutting edge extending between corners of said upper surface.

a first axial cutting edge formed at the intersection of a side surface with the upper surface, and extending substantially perpendicularly from a common corner with the first radial cutting edge.

the upper surface comprising a first concave conical portion adjacent said first radial cutting edge, a first sloping portion adjacent said first axial cutting edge, the first concave conical portion extending between corner portions of the insert and narrowing in a direction along the first radial cutting edge away from the common corner, and being formed to achieve constant positive radial rake, as defined with respect to a cutter body, throughout the length of the first radial cutting edge at the angle of inclination of said radial cutting edge as the insert is to be mounted in a cutter body with the first radial cutting edge positioned as an active radial cutting edge.

the first sloping portion sloping downwardly from said first axial cutting edge, extending between corner portions of the insert, and narrowing in the direction along the first axial cutting edge away from the first common corner, the sloping portion defining a positive axial rake, with respect to a cutter body at the angle of inclination of said axial cutting edge as the insert is to be mounted in a cutter body with the first axial cutting edge positioned as an active axial cutting edge.

said upper surface further comprising a first planar region extending between the first conical portion and the first sloping portion, and a first blend surface merging with the planar region, the first conical portion, the first sloping portion and corners of the upper surface adjacent the first sloping portion.

9. The insert of claim 5 further comprising a second radial cutting edge and a second axial cutting edge, the second radial cutting edge and the second axial cutting edge extending from a second common corner diagonally opposite the first common corner and being substantially perpendicular to each other, wherein the upper surface further comprises:

a second concave conical portion adjacent the second radial cutting edge, the second concave conical portion extending between corner portions of the insert and narrowing in the direction away from the second common corner, and being defined to achieve constant positive radial rake throughout the length of the second radial cutting edge at the angle of inclination thereof as the insert is intended to be mounted in a cutter body with the second radial cutting edge as an active radial cutting edge;

a second sloping portion adjacent the second axial cutting edge, the second sloping portion sloping downwardly from the second axial cutting edge and narrowing in the direction away from the second common corner and defined to achieve positive axial rake as the insert is mounted in a cutter body with the second axial cutting edge positioned as an active axial cutting edge;

and a second planar region adjacent the second concave conical portion and interiorly of the second sloping portion and extending to the mounting aperture, the second planar region sloping downwardly from the narrowest end of the second sloping portion toward the second common corner and upwardly from the second common corner in the direction of narrowing of the second concave conical portion.

10. A milling insert comprising:

a polygonal body having an upper quadrilateral surface, a lower quadrilateral surface and a plurality of side surfaces extending between said upper surface and said lower surface, the side surfaces sloping outwardly from the lower surface to intersection with the upper surface;

a first radial cutting edge formed at the intersection of a side surface with the upper surface, the first radial cutting edge extending between corners of said upper surface, a first axial cutting edge formed at the intersection of a side surface with the upper surface, and extending substantially perpendicularly from a common corner with the first radial cutting edge, a second radial cutting edge and a second axial cutting edge extending from a second common corner diagonally opposite the first common corner, said second cutting edges being substantially perpendicular to each other, the upper surface comprising first and second concave conical portions adjacent said first and second radial cutting edges, respectively, and first and second sloping portions adjacent said first and second axial cutting edges respectively, the concave conical portions extending between corner portions of the insert and narrowing in a direction associated with increasing depth of cut along respective radial cutting edges adjacent thereto, each concave conical portion being formed to achieve constant positive radial rake, as defined with respect to a cutter body, throughout the length of the adjacent radial cutting edge at the angle of inclination of said adjacent radial cutting edge as the insert is to be mounted in a cutter body with the adjacent radial cutting edge positioned as the active radial cutting edge, the sloping portions sloping downwardly from respective adjacent axial cutting edges, extending between corner portions of the insert, and narrowing in the direction along respective axial cutting edges adjacent thereto away from respective common corners, each sloping portion defining a positive axial rake, with respect to a cutter body at the angle of inclination said axial cutting edge as the insert is to be mounted in a cutter body with the adjacent axial cutting edge positioned as the active axial cutting edge, the upper surface further comprising a first planar region extending between the first conical portion and the first sloping portion, and a second planar region extending between the second conical portion and the second sloping portion, wherein a first blend surface merges with the first planar region, the first conical portion, the first sloping portion and corners of the upper surface adjacent the first sloping portion, and a second blend surface merges with the second concave conical portion, the second sloping portion, the second planar region and corners of the insert adjacent the second sloping portion.

11. The milling insert of claim 9 wherein the first and second axial cutting edges curve outwardly relative to the center of the upper surface.

12. The milling insert of claim 9 wherein the first and second concave conical portions are defined by cones having circular cross-section.

13. The milling insert of claim 9 wherein the first and second concave conical portions are defined by cones having elliptical cross-section.

14. A milling cutter comprising:

a cutter body; and a cutting insert comprising a polygonal body having an upper surface, comprising a center and a periphery, a lower surface and a plurality of side surfaces extending between said upper surface and said lower surface, the side surfaces sloping outwardly from the lower surface to intersection with the upper surface;

a first cutting edge and a second cutting edge, each cutting edge formed at the intersection of a side surface with the upper surface, the first and second cutting edges extending from a first common corner of said insert and being substantially perpendicular to each other, wherein the upper surface comprises a first concave conical portion adjacent said first cutting edge, the first concave conical portion extending between corner portions of the insert and narrowing in the direction away from the first common corner and defined to achieve constant positive radial rake throughout the length of the first cutting edge at the angle of inclination thereof as the insert is intended to be mounted in the cutter body with the first cutting edge positioned as an active radial cutting edge, a first sloping portion adjacent said second cutting edge, said first sloping portion sloping downwardly from said second cutting edge, extending between corner portions of the insert, and narrowing in the direction away from the first common corner and defined to achieve positive axial rake as the insert is intended to be mounted in the cutter body with the second cutting edge positioned as an active axial cutting edge.

15. The milling cutter of claim 14 wherein the insert further comprises a mounting aperture extending through said milling insert from said lower surface to said upper surface, and the milling cutter further comprises a mounting screw.

16. The milling cutter of claim 15 wherein the insert further comprises: a first planar region adjacent the first concave conical surface and interiorly of the first sloping portion and extending to the mounting aperture, the first planar region sloping downwardly from the narrowest end of the sloping portion toward the first common corner and upwardly from the first common corner in the direction of narrowing of the first concave conical portion and a first blend surface merging smoothly with the planar region and the first sloping portion and, at the common corner, with the first concave conical portion and the first sloping portion.

17. The milling cutter of claim 14 wherein the insert further comprises a narrow land interposed between the first and second cutting edges and the concave conical portion and the sloping portion, respectively.

18. The milling cutter of claim 14 wherein the insert further comprises third and fourth cutting edges extending from a second common corner diagonally opposite the first common corner and being substantially perpendicular to each other, wherein the upper surface further comprises a second concave conical portion adjacent the third cutting edge, the second concave conical portion extending between corner portions of the insert and narrowing in the direction away from the second common corner and defined to achieve constant positive radial rake along the length of the third cutting edge at the angle of inclination thereof as the insert is intended to be mounted in the cutter body with the third cutting edge positioned as an active radial cutting edge, a second sloping portion adjacent the fourth cutting edge, the second sloping portion sloping downwardly from the fourth cutting edge and narrowing in the direction away from the second common corner and defined to achieve positive axial rake as the insert is intended to be mounted in the cutter body with the fourth cutting edge positioned as an active axial cutting edge, and a second planar region adjacent the second concave conical portion and interiorly of the second sloping portion and extending to the mounting aperture, the second planar region sloping downwardly from the narrowest end of the second sloping portion toward the common corner and upwardly from the second common corner in the direction of narrowing of the second concave conical portion.

19. The milling insert of claim 18 wherein the second and fourth cutting edges are curved outwardly relative to the center of the upper surface.

20. A milling insert comprising:
- a polygonal body having an upper surface comprising a center and a periphery, a lower surface and a plurality of side surfaces extending between said upper surface and said lower surface, the side surfaces sloping outwardly from the lower surface to intersection with the upper surface;
- a first radial cutting edge formed at the intersection of a side surface with the upper surface, the first radial cutting edge extending between corners of said upper surface;
- a first axial cutting edge formed at the intersection of a side surface with the upper surface, and extending from a common corner with the first radial cutting edge;
- the upper surface comprising a first concave conical portion adjacent said first radial cutting edge, the first concave conical portion extending between corner portions of the insert and narrowing in a direction along the first radial cutting edge away from the common corner, and varying directions of tangents to said first concave conical portion whereby radial rake as defined with respect to a cutter body is positive and substantially constant throughout the length of the first radial cutting edge as the insert is to be mounted in a cutter body with the first radial cutting edge positioned as an active radial cutting edge.

* * * * *